(12) United States Patent
Salimov et al.

(10) Patent No.: US 10,679,012 B1
(45) Date of Patent: Jun. 9, 2020

(54) TECHNIQUES TO ADD SMART DEVICE INFORMATION TO MACHINE LEARNING FOR INCREASED CONTEXT

(71) Applicant: Capital One Services, LLC, McLean, VA (US)

(72) Inventors: Alan Salimov, San Bruno, CA (US); Anish Khazane, San Francisco, CA (US); Omar Florez Choque, Oakland, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/388,838

(22) Filed: Apr. 18, 2019

(51) Int. Cl.
  *G06F 40/30* (2020.01)
  *G06N 20/00* (2019.01)
  *G06F 16/28* (2019.01)
  *G06F 40/205* (2020.01)

(52) U.S. Cl.
  CPC ........... *G06F 40/30* (2020.01); *G06F 16/283* (2019.01); *G06F 40/205* (2020.01); *G06N 20/00* (2019.01)

(58) Field of Classification Search
  USPC ...................................................... 704/7–10
  See application file for complete search history.

(56) References Cited

U.S. PATENT DOCUMENTS

| | | | |
|---|---|---|---|
| 9,529,505 B2* | 12/2016 | Raskin | G06F 3/0484 |
| 9,626,629 B2* | 4/2017 | Vijayaraghavan | G06N 5/025 |
| 10,009,716 B1 | 6/2018 | Niles | |
| 2012/0166879 A1* | 6/2012 | Watanabe | G06F 11/0751 714/37 |
| 2014/0120963 A1* | 5/2014 | Rukman | H04L 51/36 455/466 |
| 2014/0350424 A1 | 11/2014 | Du et al. | |
| 2016/0004224 A1 | 1/2016 | Pi | |
| 2016/0125039 A1 | 5/2016 | Ekler et al. | |
| 2016/0371454 A1 | 12/2016 | Cho | |
| 2017/0018001 A1 | 1/2017 | Tunnell et al. | |
| 2017/0083198 A1* | 3/2017 | Raskin | G06F 3/0484 |
| 2017/0091653 A1* | 3/2017 | Jat | G06F 16/285 |

(Continued)

OTHER PUBLICATIONS

Khulage et al. "Analysis of Speech Under Stress Using Linear Techniques and Non-linear Techniques for Emotion Recognition System", arXiv:1207.5104, submitted: Jul. 21, 2012, pp. 1-10, Cornell University Computer Science & Information Technology.

(Continued)

*Primary Examiner* — Leonard Saint Cyr

(57) ABSTRACT

Disclosed are an apparatus, a system and a non-transitory computer readable medium that implement processing circuitry that receives non-dialog information from a smart device and determines a data type of data in the received non-dialog information. Based on the determined data type, the processing circuitry transforms the received first data using an input from a machine learning algorithm into transformed data. The transformed data is standardized data that is palatable for machine learning algorithms such as those used implemented as chatbots. The standardized transformed data is useful for training multiple different chatbot systems and enables the typically underutilized non-dialog information to be used to as training input to improve context and conversation flow between a chatbot and a user.

17 Claims, 7 Drawing Sheets

(56) References Cited

U.S. PATENT DOCUMENTS

| | | |
|---|---|---|
| 2017/0249434 A1 | 8/2017 | Brunner |
| 2018/0018704 A1* | 1/2018 | Tunnell et al. |
| 2019/0043106 A1* | 2/2019 | Talmor ............... G06Q 30/0617 |
| 2019/0179504 A1* | 6/2019 | Raskin ................. G06F 3/0484 |

OTHER PUBLICATIONS

Pennington et al., "GloVe: Global Vectors for Word Representation", Proceedings of the 2014 Conference on Empirical Methods in Natural Language Processing (EMNLP), Oct. 25-29, 2014, pp. 1532-1543, Association for Computational Linguistics, Doha, Qatar.
Li et al., "A Persona-Based Neural Conversation Model", arXiv:1603.06155v1, submitted: Jun. 8, 2016, pp. 1-10, Cornell University Computer Science & Information Technology.

* cited by examiner

440

WEIGHT A DATA TYPE ATTRIBUTE BASED ON AN OUTPUT FROM A MACHINE LEARNING ALGORITHM TRAINED USING PREVIOUSLY OBTAINED NON-DIALOG INFORMATION OF THE SAME DATA TYPE AS THE DETERMINED DATA TYPE

443

↓

INPUT THE WEIGHTED DATA TYPE ATTRIBUTES RELATED TO THE DETERMINED DATA TYPE OF THE EXTRACTED NON-DIALOG DATA AND THE EXTRACTED NON-DIALOG DATA INTO THE SELECTED MACHINE LEARNING-BASED DATA TRANSFORMATION

445

↓

PROCESS THE INPUTTED WEIGHTED DATA TYPE ATTRIBUTES RELATED TO THE DETERMINED DATA TYPE OF THE EXTRACTED NON-DIALOG DATA AND THE EXTRACTED NON-DIALOG DATA

447

↓

OUTPUT DATA POINTS AND, FOR EACH DATA POINT, DATA POINT PROBABILITY INFORMATION AS THE STANDARDIZED NON-DIALOG DATA TO THE CHATBOT TRAINING DATA STRUCTURE

TECHNIQUES TO ADD SMART DEVICE INFORMATION TO MACHINE LEARNING FOR INCREASED CONTEXT

BACKGROUND

Artificial intelligence has enabled computer systems to conduct conversations, either textual or computer-generated speech, with humans. Most people encounter these conversant computer systems in the form of customer service chatbots. These customer service oriented chatbots may use leading questions to elicit an appropriate response from the human participant. As a result, the conversation while straight forward has a "mechanical" quality to it that may be off-putting to some of the human participants.

While canned expressions, such as "I hope you are having a good day" or for repeat callers, "Thank you contacting us again," may provide a more realistic feel to the conversation, these canned expressions may only make the conversation flow seem forced and disingenuous since there is no context in the conversation for such canned expressions. Accordingly, a problem with chatbot training is that the chatbot models often default to the most generic speech patterns due to a lack of context obtained from the training data.

There is a need for ways to mitigate the mechanical, or "machine-like" speech quality of current chatbot conversations and provide more realistic conversational flow and context by referencing real-life aspects of a human participant.

SUMMARY

Disclosed is an example of an apparatus including a memory and processing circuitry. The memory may store programming code. The processing circuitry may be coupled to the memory and have an input and an output. The processing circuitry is operable to execute the stored programming code that causes the processing circuitry to receive first data from a first smart device. A data type of the received first data may be determined. The determined data type may indicate a category of the first smart device. Based on the determined data type, the received first data may be transformed into transformed data using a data transformation process that receives an input from a machine learning algorithm. The transformed data may be output to a chatbot training data structure, which is coupled via the output to the processing circuitry.

A system example is also disclosed. The system may include a chatbot data warehouse, a communication interface, a memory, and a server. The communication interface may be coupled to the chatbot data warehouse and to an external network. The communication interface receives, via the external network, anonymized non-dialog data from smart devices. The server is coupled to the memory and the communication interface. The server includes processing circuitry that executes the programming code stored in the memory. The execution of the programming code causes the processing circuitry to obtain, via the communication interface, the non-dialog data. A data type of the received non-dialog data is identified. Based on the identified data type, at least one machine learning-based data transformation from a plurality of machine learning-based data transformations is selected. The non-dialog data is input into each of the at least one selected machine learning-based data transformations. The transformed data may be received from each of the at least one selected machine learning-based data transformations into which the non-dialog data was input and stored in the chatbot data warehouse. The transformed data is formatted in the same format as the dialog data stored in the chatbot data warehouse.

An example of non-transitory computer-readable storage medium storing computer-readable program code executable by a processor is also disclosed. The execution of the computer-readable program code causing the processor to receive, via a coupling to an external network, a data set containing non-dialog data, wherein the data set is generated based on data provided by a smart device. The non-dialog data is extracted from the received data set. A data type of the extracted non-dialog data is determined. Based on the determined data type, a machine learning-based data transformation to be applied to the extracted non-dialog data is selected. The selected machine learning-based data transformation is applied to the extracted non-dialog data to obtain standardized non-dialog data; and the standardized non-dialog data is stored in a chatbot training data structure.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

FIG. 4A illustrates an example of a data transformation subprocess flow that processes the smart device data into a standardized data type usable with machine learning systems.

DETAILED DESCRIPTION

Figure 1:
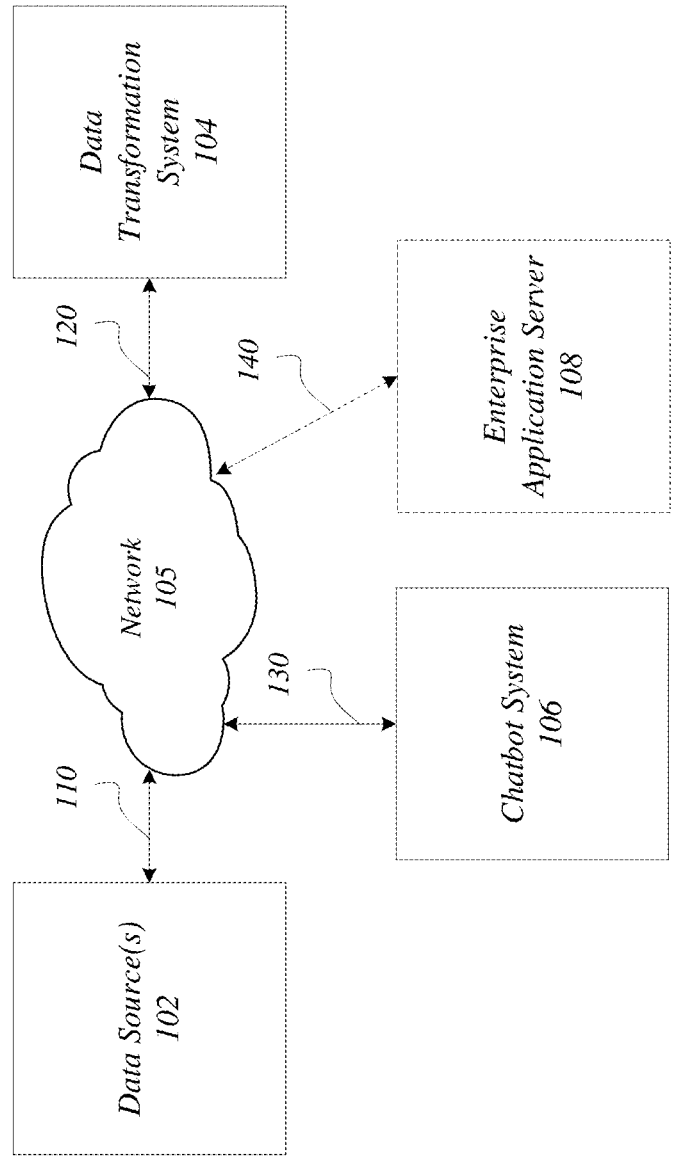
FIG. 1 illustrates an example of a data collation and chatbot training system.

Various embodiments are generally directed to techniques to perform a generalization of data from non-dialog data sources, such as a wearable fitness smart device, a wearable smart device, an exercise device, a personal assistance device; audio system assistance device, or a home automation device, or the like. Embodiments include an apparatus having a memory storing programming code and processing circuitry coupled to the memory and a chatbot training data structure. The processing circuitry may have an input and an output and is operable to execute the stored programming code that causes the processing circuitry to perform functions. In an example, the functions may include receiving first data from a first smart device and determining a data type of the received first data. Based on the determined data type, the processing circuitry transforms the received first data using an input from a machine learning algorithm into transformed data. The transformed data is output by the processing circuitry to a chatbot training data structure.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives within the scope of the claims.

The described examples address the problem of under-utilization of smart-device data with respect to machine learning in an enterprise network, such the banking space. Huge amounts of data from smart devices are typically discarded or overlooked, and machine learning requires significant amounts of data to be useful. The related figures and the discussion describe a method, a computer readable medium, an apparatus, and a system that enable data from smart devices to be used to provide a consistent way to gather information from users' smart devices, standardize the data, and incorporate that standardized data into existing and future machine learning techniques.

The described examples are substantially different from any "Internet-of-Things" or data mining techniques in general because the examples enable a conversion of device data to data that is palatable for machine learning algorithms. Existing methods that do involve a data pipeline from smart devices feature a disjoint set of technologies that do not enable a data transport. The example system, by coupling smart devices and machine learning algorithms together, may be substantially seamless and allows for the learned orchestration of disparate data types together as well.

The described examples may obtain data from an enterprise customer who may generate a huge amount of data on a daily basis that is currently unused. The unused data may take the form of physical activity representations, textual conversations with other people, information regarding listening or viewing habits and the content that is listened to or viewed, wake up time, sleep time, exercise time or work time, and the like. A benefit of the described examples is to serve the disparate data, the data's relative context or a combination of both to chatbot machine learning models as additional information and attributes from which conversational context may be learned. An improvement provided by the described examples is the surpassing of existing implementations of Internet of Things solutions because the described examples provide a standardized method to collect data tailored to chatbots while preserving privacy. Data is preserved because raw personal data stays with the user and is not obtained by the described enterprise.

A basic example of a data structure is to encapsulate smart device data into matrices and vectors the definitions of which rely on a current enterprise system-owned machine learning model that is training in the enterprise network. These matrices and vectors provide data usable as contextual and training data to chatbot machine learning algorithms in the cloud or stored in traditional enterprise storage solutions. This involves a web of users' smart devices, the procurement of data from these smart devices, and the conversion of this raw data into a standardized data type.

An example of a practical application of this smart device data collation is chatbot data collection. Not only may dialog between users be collected, but additional user non-dialog data may also be collected as well. For example, inferences as to whether a user is excited or relaxed may be drawn from non-dialog data, such as accelerometer data collected from a smart phone, or whether a user is doubtful, stressed or experiencing another emotion may be drawn from a pitch tone extracted from audio data of a conversation. The quantity of data that a user generates with all their smart devices is immense, and some training value ought to be extracted from it to avoid wasting an opportunity to obtain contextual data. Examples of non-dialog data include accelerometer data, sound-related data, such as pitch, timbre, intensity and duration, from dialog data, weather related data, or the like. Consider, for example, one type of data that most enterprises and other companies that train chatbots typically discard is health information. In the example of health information, many smart devices log basic health data, such as number of steps walked per day, heart rate, number of glasses of water drank, number of exercises (e.g., pushups, pullups, miles run, and the like), and so on. This health information may be used as a metric that serves as an indicator of health, mood, and life circumstance. Without the presently described subject matter, this data would continue to be discarded, or if naively collected, a complicated data transformation step would be required. However, treating health data the same as other data by having a standard, learned transformation step may allow a data scientist to gracefully add the transformed data of the health information to their machine-learning model.

FIG. 1 illustrates an example of data collation and chatbot training system suitable for performing the described process examples. The data collation and chatbot training system 100 may be part of an enterprise network that is configured to receive data and collate the data and place the data in a standardized format for use in training chatbots. Embodiments are not limited in this manner.

In embodiments, the data collation and chatbot training system 100 may include data source(s) 102, a data transformation services system 104, and chatbot services system 106. These devices and systems may be coupled via one or more networking links 110, 120 and 130. For example, each of the data source(s) 102, the data transformation system 104, and the chatbot system 106 may be coupled with network 105, e.g., an enterprise network, via one or more wired and/or wireless network links. In some embodiments, the data source(s) 102, the data transformation system 104, and the chatbot system 106 may be coupled via dedicated networking links 110, 120 and 130, e.g., a point-to-point wireless or wired network, a point-to-point fiber network, telephone network (dial-up modem network), or the like. Embodiments are not limited in this manner.

In embodiments, the data collation and chatbot training system 100 may collect and process data associated with data source(s) 102. For example, the system 100 may receive data from one or more different data source(s) 102 either directly or via other connections. Examples of data source(s) 102 may include computers, such as an enterprise-related application executing on the computer, a smart phones or tablets, book readers, such as a Kindle, wearable fitness smart devices, such as a Fitbit®, or a Garmin® watch; a wearable smart device, such as an Apple® watch or Samsung® Gear®; an exercise device, such as a Peloton® bike or treadmill; a personal assistance device, such as Google Home® or Amazon® Echo; an audio system assistance device, such as Amazon® Echo or Alexa® that connects, for example, to Amazon Prime® or Pandora music services, a home automation device (e.g., a door lock system, a security system, a doorbell camera, or the like), such as a number of Nest® devices, a website or cloud-based data storage location. Each of different data sources 102 may provide data having a data type specific to the data source. In an example, a data source 102, such as a smart device, may communicate with a computer or other computing device executing the enterprise-related application, and upload data or information generated by the data source, such as non-dialog data or information, to the computer or other computing device (shown in other examples). Each computer may execute a respective instance of the multiple instances of an enterprise-related application, which configures a respective processor of the computer to obtain the uploaded non-dialog data for data transformation. The respective instance of the enterprise-related application may anonymize the non-dialog data and forward via an external network, such as the Internet or a cellular network, the anonymized non-dialog data to a server coupled to a communication interface (described in more detail with another example) for data transformation. In a specific smart fitness device example, a Fitbit device may provide fitness-related data having a specific data type for use with Fitbit-compatible computer/mobile applications or websites. The Fitbit-compatible computer/mobile applications or websites may be "universal" types of computer/mobile applications and websites capable of processing data provided by not only Fitbit devices, but any type of smart fitness device.

The enterprise-related application executing on the computer, other computing device may process the non-dialog data to determine a data type of the data. The data type of the data may indicate the category of the smart device providing the data. For example, wearable smart fitness devices may provide non-dialog data in multiple different types having different formats. The data types provided by the respective data sources may be, for example, training center extensible markup language (XML) (TCX), Microsoft Excel (XLS), flexible and interoperable data transfer protocol (FIT), comma-separated value (CSV), GPS exchange format (GPX) or the like; and the data included, may differ from one data type to another. Therefore, a data type such as FIT may indicate a fitness device as the category of the device providing the data, while GPX may indicate a GPS device as the category of the device providing the data. In addition, some data types may include additional data related to body, food, activities, and sleep patterns. The body data provided by a respective data type may vary between providing and not providing information such as, for example, blood oxygen level, weight, heart rate, body mass index, calculated percentage of body fat, or the like. The different types may also provide different levels of fitness information, such as distance calculations as opposed to just positional information (e.g. latitude and longitude coordinates). For example, in the case of a global positioning system (GPS)-enabled fitness device, the fitness data, such as steps, heart rate and distance traveled, generated by the fitness device may be in a first format such as those listed above, while the GPS data may be in a second, different data type, such as GPX. Alternatively, all data generated by the fitness device including the GPS data may be stored in a single data type, such as TCX or GPX. Other examples of non-dialog data obtained from different data sources include smart phone application preference settings, music playlists selected on audio system devices or music services, lists of products ordered on-line, time of exit/entry in a home security system, and the like. All the different data may be used to develop context for use in improving and further developing conversational context of a chatbot.

Each of the different data types TCX, XLS, FIT, CSV, GPX or the like, may be transmitted in a form that includes data identifiers in the data header, or may have a format indicative of the respective format. For example, a TCX file may have "<Activities>" as an initial XML code in contrast to a code entry of a GPX file. Of course, to preserve user privacy and prevent misuse of data, users would be able to withhold data as well as having options to opt-out or opt-in to the data collection program. It is important that users are in control of their data, and to keep previously unused data unused.

The communication interface 290 may receive via the external network anonymized non-dialog data from smart devices 221-223 that is forwarded to a server in the data transformation system 204.

In general, the described data transformation has an added benefit of obscuring the content of the data itself; since specific information may be converted into multidimensional matrices and vectors of numbers, identifying what specific values mean would be at least very difficult, if not impossible, and time-consuming. By informing users of the process and giving them a choice over their contribution, there is little chance of deception or abuse.

The system 100 may also include the data transformation system 104. The data transformation system 104 may operate to transform the format of data by using a data transformation process/function/algorithm that is specific to the data type of the data source 102. The data transformation system 104 may be processing circuitry configured to execute process programming code that causes the processing code to perform functions. Alternatively, the data transformation system 104 may be implemented as a server coupled to a memory and the network 105. The data transformation system 104 structure and functions are described in more detail with reference to the examples of FIGS. 2-6.

The chatbot system 106 may be coupled to the network 105 via the network connection 130. The chatbot system 106 may implement a group of interactive systems that provide services or information by interacting (e.g. "conversing") with human users either via auditory (e.g., telephones, audio equipped Internet devices) or textual systems, such as telephone text messaging, messaging clients built into websites. The chatbot system 106 may include multiple different chatbots that are used for different types of interactions. For example, a first chatbot may communicate information about user financial services, while a second chatbot may collect financial information for loan purposes.

Alternatively, some chatbots may be trained to converse in a regional dialect of a particular geographical area. For example, a chatbot that has trained on training data from data sources associated with the Southern states of the United States may be selected to converse with a human user from Alabama, while a human user in Massachusetts may be connected to a chatbot trained on data sources from Northern states of the United States.

The chatbot system 106 may, for example, include training and validation systems that train and validate artificial intelligence or machine learning algorithms (collectively referred to as "chatbot models") used by the interactive systems to converse (using machine-generated speech or text) with the human users. As used herein, the terms "converse" may mean exchanging information with a human user (or an intelligent device capable of interpreting audio or text content) via either machine-generated speech or by textual exchanges, and "speech" may be either auditory or textual.

A technical justification for collecting this previously unused data from data sources, such as 102, follows from the importance of user-specific context during conversations to address the problem of generic or mechanical speech (and textual) patterns from chatbots. With the significant amount of previously discarded data now incorporated as context input for machine learning models, chatbot models may be tailored to users in ways previously not possible. For example, a chatbot may not only have access to user-specific patterns of speech, but also information about habits, relationships, and motivations. With added context over a variety of fields of user interest, chatbot models may attenuate or mitigate the use of mechanical speech (or text) patterns and provide speech (and text) generated according to new, attribute-centered techniques.

For example, the chatbot system 106 may operate almost continuously by receiving new training data and inputting the new training data into the artificial intelligence or machine learning algorithms to improve the human user's experience with the respective chatbot and to improve performance of a process guided by the chatbot by making the spoken or textual conversation less formalistic. This new training data is transformed into suitable form for input to the chatbot models or pre-processing functions.

Figure 2:
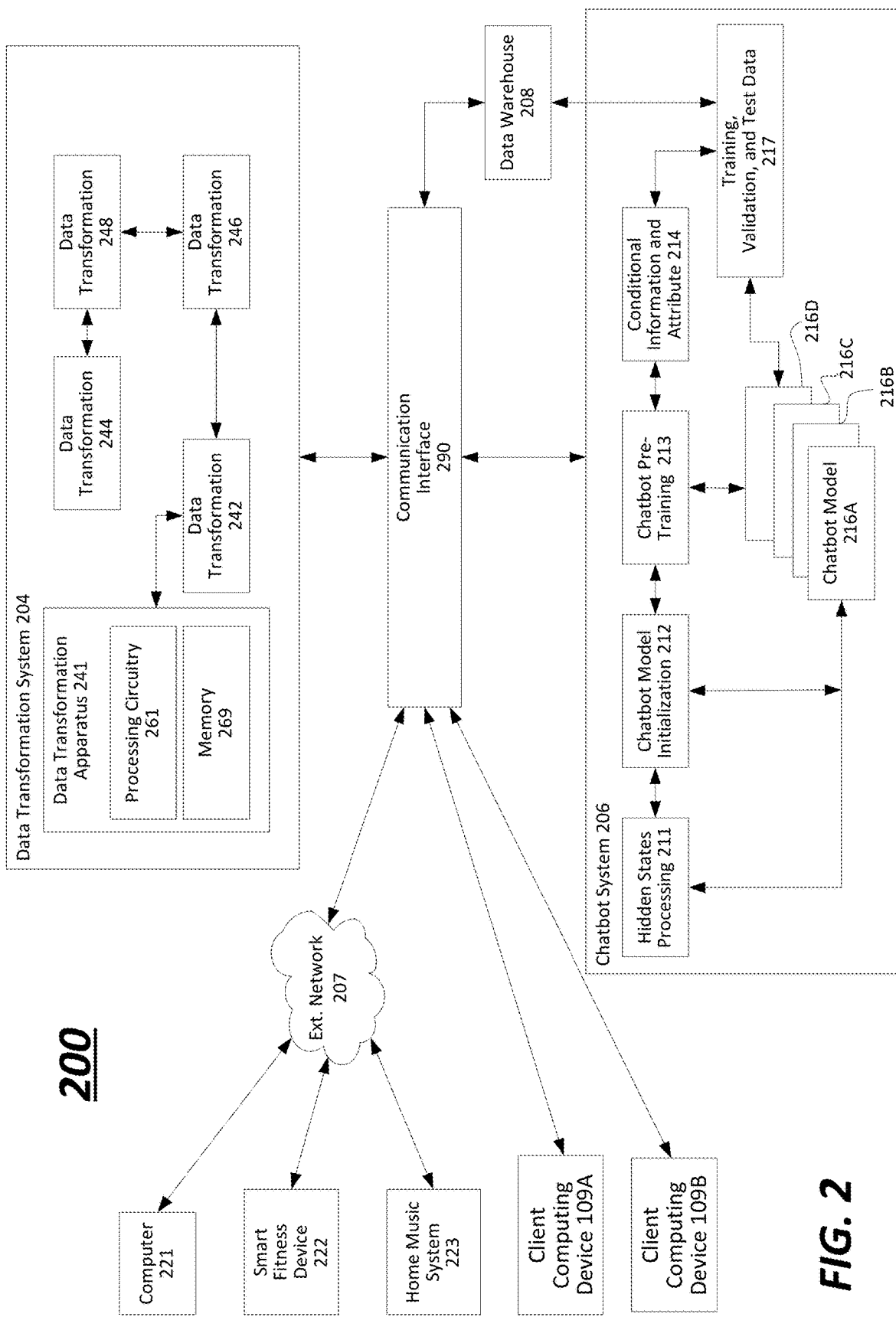
FIG. 2 is an overview of data input, transformation, and usage with an example of a system, such as that shown in FIG. 1.

It may be helpful at this time discuss a more detailed example of the data collation and transformation performed by system 100 with reference to the more detailed example shown in FIG. 2.

FIG. 2 is an overview of data input, transformation, and usage with an example of a system, such as that shown in FIG. 1. The system 200 may include smart devices 221, 222, and 223, a data transformation apparatus 204, a chatbot system 206, and a chatbot data warehouse 208.

The smart devices 221, 222, and 223 may be coupled to an external network (not shown in this example) that couples via communication interface 290 to the data transformation apparatus 204. Examples of the smart devices 221, 222 and 223 may be similar to the data sources 102 described with respect to FIG. 1. The communication interface 290 may include couplings to networks, such as 105 of FIG. 1, the data transformation system 204, the chatbot system 206, the chatbot data warehouse 208, and other networks, such as an external network, and systems (not shown). The communication interface 290 may receive via the external network anonymized non-dialog data from smart devices 221-223 that is forwarded to a server in the data transformation system 204.

The chatbot data warehouse 208 may be a chatbot training data structure storing data including transformed non-dialog data and dialog data. The stored transformed non-dialog data and dialog data may be stored in various formats including generalized formats for use by multiple different chatbot models.

The data transformation system 204 may comprise a data transformation apparatus 241 having processing circuitry 261 that executes programming code stored in a memory 269 coupled to the processing circuitry 261. The data transformation apparatus 241 may be implemented in the form of a server or other computing device. The processing circuitry 261 may include couplings to the communication interface 290 and to several machine learning-based data transformations, such as 242, 244, 246 and 248. The machine learning-based data transformations may include a vectorization transformation 242, word representation transformations 244, such as the GloVe model, learned representations transformation 246, and statistics-based transformation 248. Of course, the number of machine learning-based data transformations may include other transformations, but for ease of discussion, only a few are listed. Other transformations may include matrix factorization, statistical analysis, semantic hashing, latent semantic indexing or the like. The machine learning-based data transformations may receive input from machine learning algorithms, such a regression algorithm, decision tree algorithms, support vector machines, k-nearest neighbors algorithms, K-means clustering algorithms, deep neural networks, dimensionality reduction algorithms, or the like to improve the accuracy and efficiency of the data transformation.

The chatbot system 206 may comprise several pre-processing modules or functions, such as hidden states processing module 211, the chatbot model initialization processing module 212, functions performed by pretrained chatbot models 213, and conditional information and attributes module 214, that pre-process data for input into one or more of the chatbot models 216A-216D. The chatbot system 206 may also include separate training, validation and test data storage 217 that stores data used to further train, test and validate the performance of the chatbot models. Client computing devices 109A and 109B may be coupled to the communication interface 290 and the data warehouse 208. The client devices 109A and 109B may retrieve via the communication interface 290 transformed dialog data and non-dialog data from the chatbot data warehouse 208 for use in training a chatbot.

For example, the transformed non-dialog data and dialog data stored in the chatbot data warehouse 208 may be served or retrieved in various formats to various enterprise chatbot models or pre-processing functions. A chatbot model may be an algorithm or function that operates on data supplied by pre-processing modules. The storage of the data may happen in the form of direct warehousing alongside the training data chatbots are already using for long-term use. This allows for non-dialog and dialog data collection from data sources, such as 221-223 and other sources (e.g., recorded customer service calls or the like), to keep happening regardless of whether a model is training. For time-dependent applications, a particular chatbot model (e.g., 216A of chatbot models 216A-216D) may be both training and be used to process a "live conversation" with a user, data may be directly served to chatbot models and stored in-memory for training algorithms as hidden state vectors which do not disclose personal data as they are sub-products (i.e., transformations) of the trainable parameters of a particular machine learning model of the chatbot models 216A-D in chatbot system 206.

The processing circuitry 261 upon execution of the programming code stored in the memory may perform a few functions. Examples of the functions are described in more detail below with reference to an example process shown in FIG. 3

Figure 3:
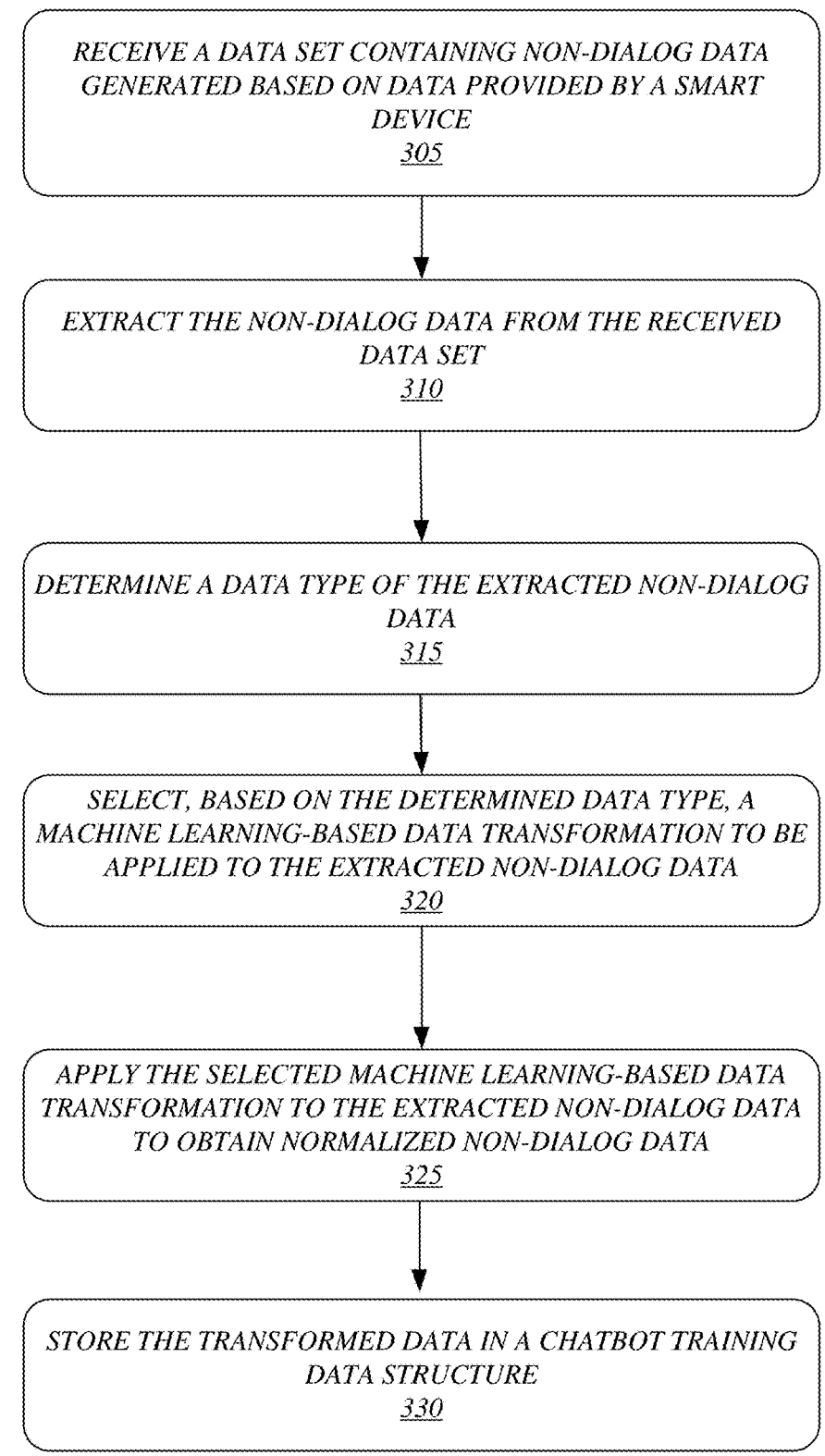
FIG. 3 is an example of a process flow usable in the system example of FIG. 2.

FIG. 3 is an example of a process flow usable in the system example of FIG. 2. The process 300 may be implemented by execution of computer-readable program code stored on a non-transitory computer-readable storage medium by processing circuitry such as that described above with reference to the example illustrated in FIG. 2 and with respect to later examples.

In the process 300, processing circuitry such as 261 of FIG. 2 may receive, via a coupling, such as communication interface 290, to an external network, a data set containing non-dialog data (305). The data set may be generated based on data provided by a smart device. For example, the received data may be received from a first smart device such as a wearable fitness device 222 of FIG. 2, and, as such, may be referred to as first data.

The received data set may include dialog data, non-dialog data and other data that is not relevant to the chatbot training. The processing circuitry may extract the non-dialog data from the received data set (310). The processing circuitry may determine a data type (e.g., GPX, FIT, TCX, CSV or the like) of the extracted non-dialog data. In keeping with the example of receiving data from a first smart device, the data type of the received first data, may be determined by parsing the first data, and comparing the parsed first data to data identifiers or identified data patterns stored in a data structure, such as memory 269. Based on results of the comparison, the processing circuitry may identify the data type of the received first data. For example, the determined data type may be TCX. In some examples, the processing circuitry may output the identified data type as the determined data type for use by a selected transformation process when transforming the received first data into transformed data.

At 320, the process 300 selects based on the determined data type, a machine learning-based data transformation process from several data transformation processes to be applied to the extracted non-dialog data. For example, certain data transformation processes may be better suited toward processing TCX formatted data than FIT formatted data, or vice versa. Also, the different data types provide different levels of fitness information, such as distance calculations as opposed to just positional information (e.g., latitude and longitude coordinates). In an example, the selected data transformation process may use the identified data type during the transformation of the data.

The processing circuitry may apply the selected machine learning-based data transformation to the extracted non-dialog data to obtain standardized non-dialog data (325). A purpose of the data transformation step is to convert the data to a format usable for machine learning. For example, the processing circuitry may input the obtained non-dialog information into the selected data transformation process. The input attributes sent to the selected transformation process may be weighted based on outputs from a machine learning algorithm trained using previously obtained non-dialog information of a same data type as the determined data type. As such, the data transformation processes are also evolving based on machine-learning that uses historical data output from the selected data transformations. The selected data transformation process may generate data points and data point probability information as the transformed data. The transformed data may be output by the processing circuitry to a chatbot training data structure for storage (330). The chatbot training data structure may be located, for example, in the data warehouse 208 of FIG. 2, and may store the transformed non-dialog data in a chatbot training data structure. The transformed non-dialog data may be standardized in format for use by a chatbot system, such as 106 of FIG. 1 or 206 of FIG. 2.

The process 300 may occur contemporaneously for multiple smart devices. In a contemporaneous process, the processing circuitry may receive first data from a first smart device such as smart fitness device 222 of FIG. 2, and receive second data from a second smart device, such as a home music device, such as 223 of FIG. 2. In the contemporaneous process, the processing circuitry may perform steps 305 to 330 on the received second data as explained above with respect to the first data. Depending upon the determined data type of the second data, another data transformation process may be selected to transform the received second data into transformed second data. The other data transformation process may receive input from the same machine learning algorithm that provided input to the data transformation process selected to process the first data or may receive inputs from other machine learning algorithms. After the second data is transformed by the other data transformation, the transformed second data is output to the chatbot training data structure.

FIG. 4A illustrates an example of a data transformation subprocess that obtains smart device data and processes the smart device data into a standardized data type usable with machine learning systems. As mentioned above, data transformation processes may include vectorization, word representation, learned representations transformation 246. The data transformation process may be viewed as a subprocess flow, such as process step 325 of FIG. 3. For example, the data transformation process may obtain smart device data and processes the smart device data into a standardized data type usable with machine learning systems provided by the chatbot systems 106 of FIG. 1 and 206 of FIG. 2.

Figure 4B:
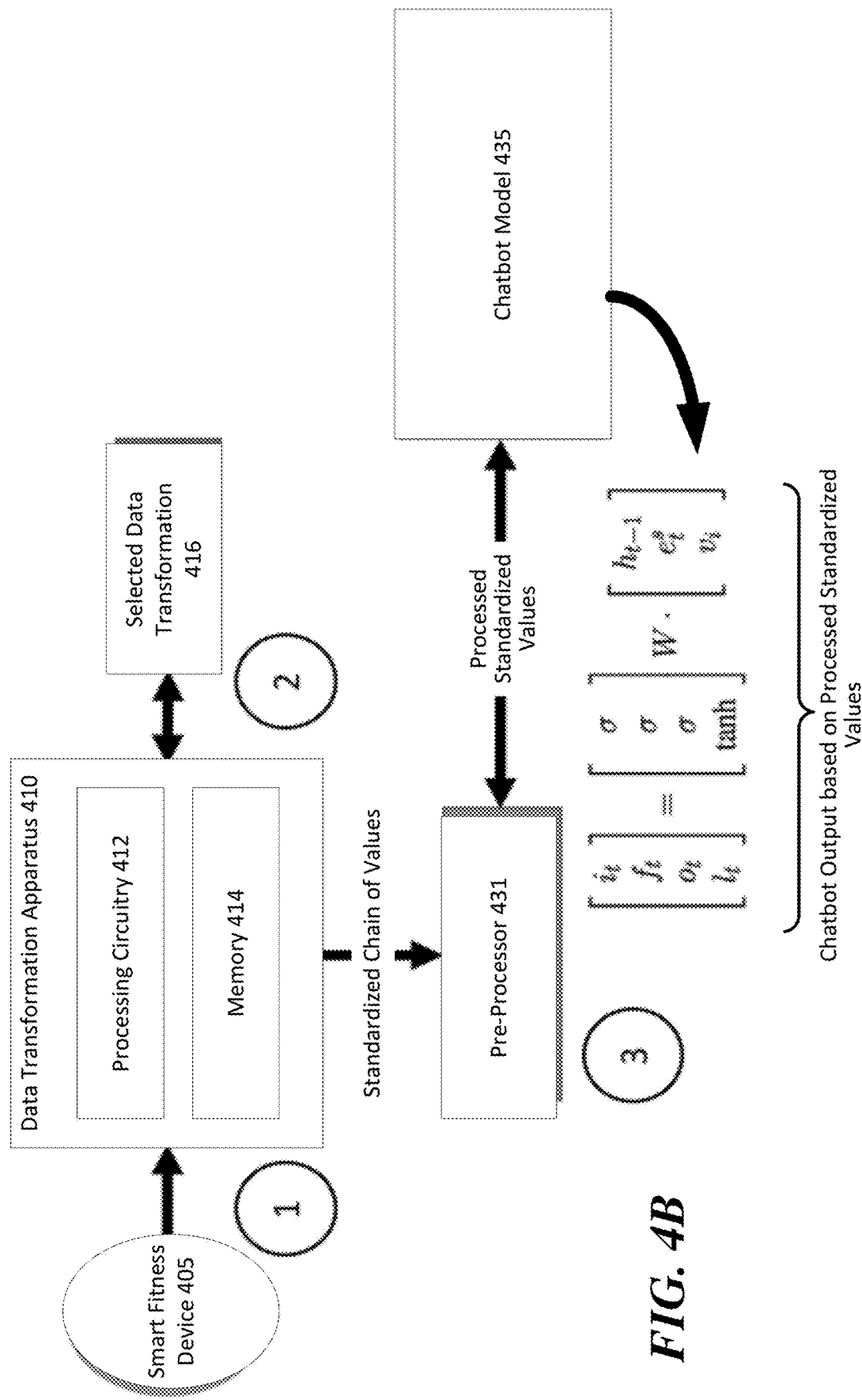
FIG. 4B illustrates hardware components and data flow related to the data transformation process example of FIG. 4A.

FIG. 4B illustrates hardware components and data flow related to the data transformation process example of FIG. 4A. The example data transformation process of FIG. 4A is explained with reference to hardware component examples shown in FIG. 4B.

The data transformation process may itself be a machine learning model. Applying a machine learning model to the data transformation has be found to be effective for the collation of disparate data (i.e. the data from the smart devices) into standardized representations. In some examples, the machine learning-based data transformation processes may receive feedback from the chatbot models, such as 216A-D of FIG. 2, operating downstream in a chatbot system, such as 206 of FIG. 2. The system parts that are relevant to the discussion of FIG. 4A are a data transformation apparatus 410 and a selected data transformation process 416. The data transformation apparatus 410 provides the output of the data transformation process 416 to a pre-processor computer 431 and a chatbot model 435, which are components of a chatbot system such as 206 of FIG. 2. The data transformation apparatus 410 may include processing circuitry 412 and memory 414.

In one aspect, the data transformation is a way for models downstream to request data and be served that data without a data scientist having to account for its format and source. An example is a chatbot training model may continuously poll for a relationship graph between the user it is learning and the user's friends. Of course, the user's friend may be previously identified and, via an opt-in/opt-out process, has permitted the collection of information related to the relationship between the friend and the user.

Like previously described examples, non-dialog information from a user's smart fitness device 405 may be received by the data transformation apparatus 410. The processing circuitry 412 by executing programming code stored in memory 414 may determine a correspondence between certain data elements in the obtained non-dialog information with a list of historical data elements. The correspondence determination may be made by applying a probability function to data elements in the obtained non-dialog information. When applying the selected machine learning-based data transformation to the extracted non-dialog data, the processing circuitry 412 may utilize a process 440 illustrated in FIG. 4B.

For example, the processing circuitry 412 may determine whether the data in the non-dialog information includes a data identifier corresponding to either a wearable fitness smart device, a wearable smart device, an exercise device, a personal assistance device, an audio system assistance device, a home automation device or the like. Upon determining that the non-dialog information data includes a data identifier, the data identifier may be extracted or copied, and matched to at least one of the data identifiers stored in a data structure containing data identifiers either in the memory 412 or a chatbot data warehouse, such as 208 of FIG. 2.

In more detail, a matching data identifier may be extracted as the result of the comparison, the processing circuitry 412 executing process 440 may, for example, at 443, weight a data type attribute based on an output from a machine learning algorithm trained using previously obtained non-dialog information has data of the same data type as the determined data type. The weighting of the data type attribute may be determined for the selected data transformation process using a machine learning algorithm trained using historical data of the determined data type.

At 445, the processing circuitry 412 may input the weighted data type attributes related to the determined data type of the extracted non-dialog data and the extracted non-dialog data into the selected machine learning-based data transformation. The processing circuitry 412 may process at 447 the inputted weighted data type attributes related to the determined data type of the extracted non-dialog data and the extracted non-dialog data.

As further explanation, the processing at 447 of the inputted weighted data type attributes by the processing circuitry 412 may be performed according to the instructions of the selected data transformation process. For example, the selected data transformation process may use a probability function. The inputted weighted data type attributes may be inputs into the probability function. The probability function applied to data elements in the obtained or parsed non-dialog information using the inputted determined weighted input attributes to determine a correspondence between certain data elements in the obtained or parsed non-dialog information with a list of historical data elements. Based on the determined correspondence, the selected data transformation process may be applied to the certain data elements determined to have correspondence.

After the processing in 447, data points, and, for each data point, data point probability information may be output at 449 as standardized non-dialog data to a chatbot training data structure.

The standardized non-dialog data including the data points and the data point probability information for each data point may be generated as a standardized chain of values. The standardized chain of values may, for example, include individual relative probability values indicating a probability of certain data elements from the non-dialog data having the determined correspondence and respective relationship probability values related to a probability of respective data elements of the certain data elements having a relationship. The standardized chain of values may be different for each selected data transformation process. The standardized chain of values may be stored, for example, in the chatbot data warehouse The processing circuitry 412 may output the standardized chain of values to the pre-processor 431 in a chatbot system. The pre-processor 431 may perform further operations to generate processed standardized values. For example, the pre-processor 431 may provide processing related to hidden states, data initialization for chatbot models, pre-training for chatbot models, conditional information and attributes and the like.

The processed standardized values may be sent to one chatbot model 435 of many chatbot models, such as 216A-D of FIG. 2, where the processed standardized values may be incorporated into a chatbot output based on the processed standardized values. For example, the processed standardized values may be incorporated into a timestep, where the left-hand sign of the equation are the Long Short-Term Memory (LSTM) algorithm components, and the right-hand side of the equation is the vector representation of the output.

Figure 5:
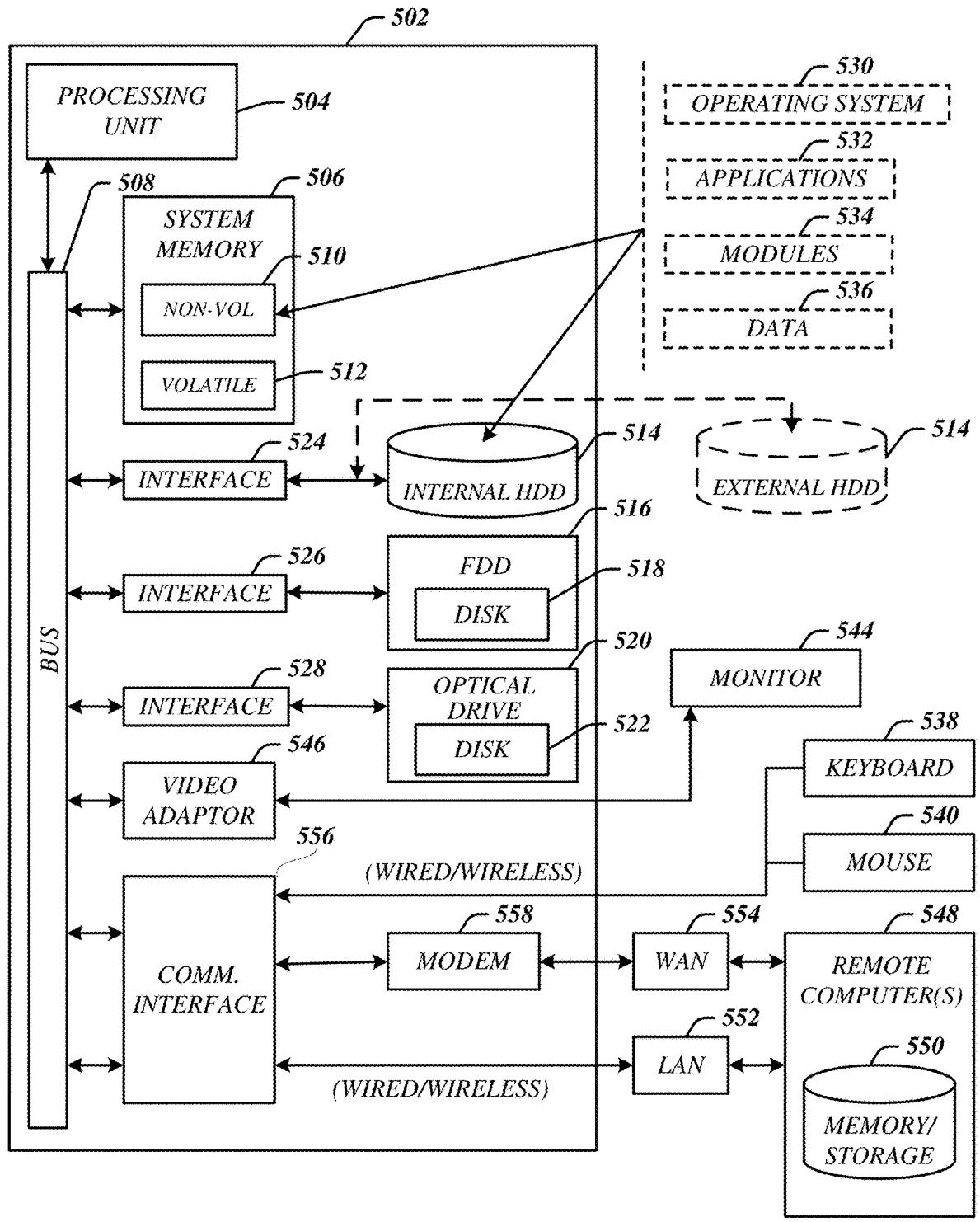
FIG. 5 illustrates an embodiment of an exemplary computing architecture suitable for implementing the devices and systems described with respect to FIGS. 1-4B.

FIG. 5 illustrates an embodiment of an exemplary computing architecture 500 suitable for implementing the devices and systems described with respect to the various examples FIGS. 1-4B. In one embodiment, the computing architecture 500 may include a hardware or software component or be implemented as part of system 100 or 200. For example, the computing architecture 500 may implement the data transformation apparatus 241, 410 or system 104 or 204, or chatbot system 106 or 206.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 includes a processing unit 504, a system memory 506 and a system bus 508. The processing unit 504 can be any of various commercially available computer processing units.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a non-transitory computer-readable storage medium may include any tangible media capable of storing electronic data, including volatile memory or non-volatile memory, removable or non-removable memory, erasable or non-erasable memory, writeable or re-writeable memory, and the like. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 614, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies. Any of the described memory or computer-readable medium may implement the memory 269 of FIG. 2 or 414 of FIG. 4. In addition, the number of data transformations, such as 242, 244, 246, and 248 of FIG. 2 or 416 of FIG. 4 may also be stored in one or more of the described memories or computer-readable media.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of a respective system, such as 100, 200 or apparatuses 241 or 410.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 504 through a communication interface 542 that is coupled to the system bus 508 but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication interface 556. The communication interface 556 can facilitate wire and/or wireless communications to the LAN 552, which may also include a wireless access point disposed thereon for communicating with the wireless functionality of the communication interface 556.

When used in a WAN networking environment, the computer 502 can include a modem 558, or is connected to a communications server on the WAN 554 or has other means for establishing communications over the WAN 554, such as by way of the Internet. The modem 558, which can be internal or external and a wire and/or wireless device, connects to the system bus 508 via the communication interface 556. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11(a, b, g, n, ac, etc.) to provide secure, reliable, fast wireless connectivity. A Wi-Fi network can be used to connect computers to each other, to the Internet, and to wire networks (which may use IEEE 802.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 6:
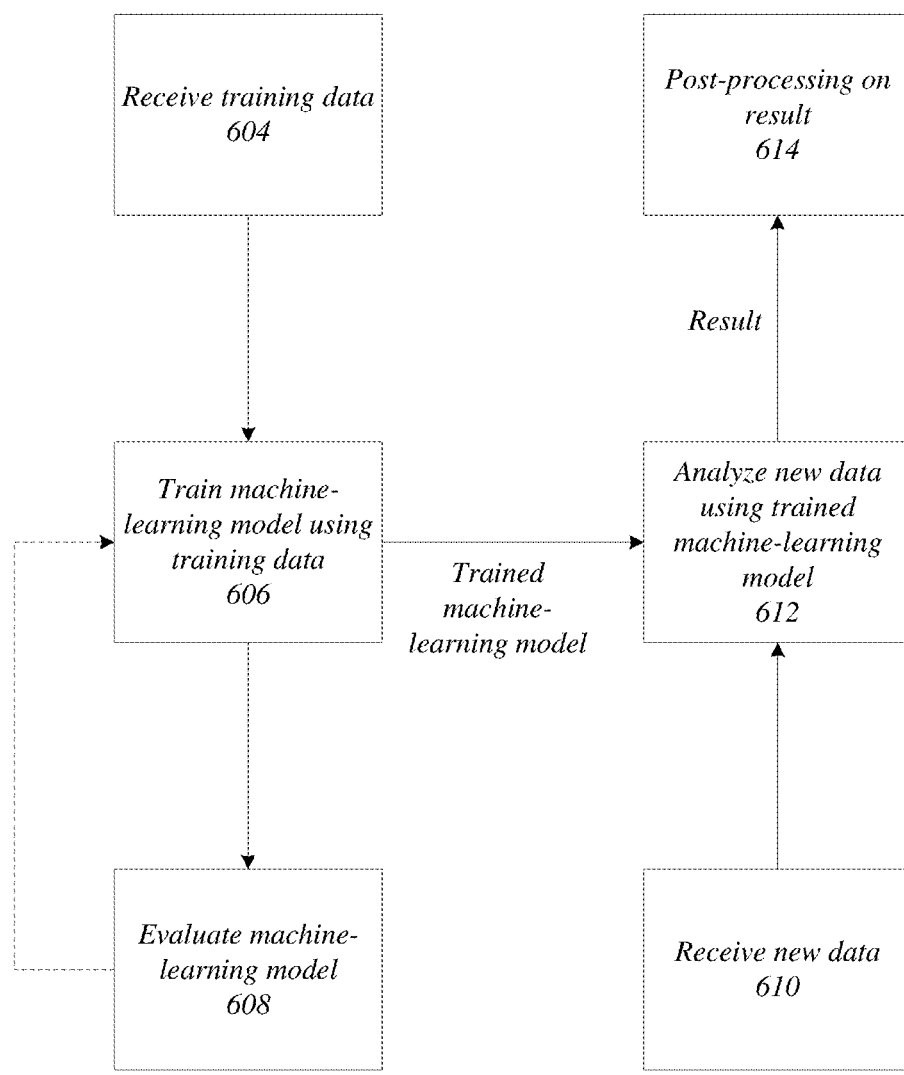
FIG. 6 is a flow chart of an example of a process for generating and using a machine-learning model according to some aspects of the disclosed subject matter, such as those shown in and described with reference to FIGS. 1-4B.

FIG. 6 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of performing natural language processing and understanding; scoring; bioinformatics; cheminformatics; software engineering; fraud detection; customer segmentation; generating online recommendations; adaptive websites; and the like.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 6.

In block 604, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In embodiments, the training data may include transaction information, historical transaction information, and/or information relating to transaction. The transaction information may be for a general population and/or specific to a user and user account in a financial institutional database system.

In block 606, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model must find structure in the inputs on its own. In semi-supervised training, only some of the inputs in the training data are correlated to desired outputs.

In block 608, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, e.g., the current transaction information, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 606, where the machine-learning model can be further trained using additional training data or otherwise modified to improve accuracy. If the machine-learning model has an adequate degree of accuracy for the particular task, the process can continue to block 610.

In block 610, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 612, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 614, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expressions "one example" or "an example" along with their derivatives. These terms mean that a particular feature, structure, or characteristic described in connection with the example is included in at least one example. The appearances of the phrase "in one example" in various places in the specification are not necessarily all referring to the same example. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure or function as referred to here, and generally, is conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, processed and otherwise manipulated. It proves convenient at times, principally for reasons of common usage, to refer to these signals as bits, values, elements, identifiers, types, symbols, characters, data, data points, information, terms, numbers, or the like. It should be noted, however, that all of these and similar terms are to be associated with the appropriate physical quantities and are merely convenient labels applied to those quantities.

Further, the manipulations performed are often referred to in terms, such as determining or comparing, which may be associated with mental operations performed by a human operator. No such capability of a human operator is necessary, or desirable in most cases, in any of the operations described herein, which form part of one or more embodiments. Rather, the described operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing machine learning based data transformation operations. The described apparatus may be specially constructed for the required purpose and may be selectively activated or reconfigured by a computer program stored in the computer. The procedures presented herein are not inherently related to a particular computer or other apparatus. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of a novel architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a data structure containing data identifiers;
   a memory storing programming code and a plurality of data transformations that receive input from a machine-learning process; and
   processing circuitry, coupled to the memory, wherein the processing circuitry has an input and an output, and is operable to execute the stored programming code that causes the processing circuitry to perform functions, including functions to:
      receive first data from a first smart device;
      determine a data type of the received first data, wherein the determined data type is indicative of a category of the first smart device;
      select, based on the determined data type, a first data transformation from the plurality of data transformations to be applied to the received first data;
      determine, for the first data transformation, weighted inputs from a machine learning algorithm trained using historical data of the determined data type;
      determine a correspondence between certain data elements in non-dialog information obtained from the received first data with a list of historical data elements by using the determined weighted inputs in a probability function applied to the obtained non-dialog information;
      transform the received first data into transformed data by applying the first data transformation to the certain data elements determined to have correspondence;
      based on the transformed data, generate a standardized chain of values including individual relative probability values indicating a probability of certain data elements having the determined correspondence and respective relationship probability values indicating a probability of a relationship between respective data elements of the certain data elements having the determined correspondence; and
      outputting the standardized chain of values to a chatbot training data structure, wherein the chatbot training data structure is coupled via the output to the processing circuitry.

2. The apparatus of claim 1, wherein the memory further comprises:
   programming code stored in the memory that causes the processing circuitry to perform further functions, including functions to:
      receive second data from a second smart device;
      determine a data type of the received second data;
      based on the determined data type of the received second data, transform the received second data into transformed second data using a second data transformation wherein the other data that receives input from a machine learning algorithm, wherein the second data transformation is the same or different from the first data transformation; and
      outputting the transformed second data to the chatbot training data structure.

3. The apparatus of claim 1, wherein the determined data type is determined from multiple different data types based on a format of the received first data.

4. The apparatus of claim 1, wherein the category of the first smart device as indicated by the data type is one of a fitness device, a global positioning system device, a smart phone application that provides non-dialog data, a home security system, or an audio system.

5. A system, comprising:
   a chatbot data warehouse storing data including dialog data used to train enterprise chatbots;
   a communication interface coupled to the chatbot data warehouse and to an external network, wherein the communication interface receives, via the external network, anonymized non-dialog data from smart devices;
   a memory storing programming code; and
   a server coupled to the memory and the communication interface, wherein the server comprises processing circuitry that executes the programming code stored in the memory, which causes the server to perform functions, including functions to:
      obtain, via the communication interface, the anonymized non-dialog data;
      identify a data type of the anonymized non-dialog data;
      based on the identified data type, select at least one machine learning-based data transformation from a plurality of machine learning-based data transformations;
      input the non-dialog data into each machine learning transformation selected from the plurality of machine learning-based data transformations;
      for each respective machine learning-based data transformation selected from the plurality of machine learning-based data transformations:
         parse the non-dialog data to obtain certain data elements specific to the identified data type;
         input the obtained certain data elements into each respective machine learning-based data transformation;
         apply each respective machine learning-based data transformation to the obtained certain data elements, wherein input attributes to each respective machine-learning based data transformation are weighted based on a machine learning algorithm trained using previously obtained non-dialog data of a same data type as the identified data type; and
         receive data transformed by each respective machine learning-based data transformation; and
      store the transformed data in the chatbot data warehouse.

6. The system of claim 5, wherein the processing circuitry of the server upon further execution of the programming code stored in the memory causes the processing circuit upon input of the non-dialog data into each of the at least one selected machine learning-based data transformations to perform additional functions including functions to:
   generate data points and probability information related to one or more data points generated by each of the at least one selected machine learning-based data transformations; and
   output the data points and the probability information of each respective machine learning-based data transformation of the at least one selected machine learning-based data transformations.

7. The system of claim 5, wherein the memory further comprises programming code stored in the memory, which causes the server when applying each respective machine learning-based data transformation, to perform additional functions, including functions to:
  determine, by applying a probability function to data elements in the obtained certain data elements, a correspondence between one or more of the certain data elements with a data element in a list of historical data elements;
  based on the determined correspondence, generate a standardized chain of values, wherein the standardized chain of values includes relative and relationship probability values; and
  store the standardized chain of values in the chatbot data warehouse.

8. The system of claim 7,
  wherein the memory further comprises programming code stored in the memory, which causes the server to perform additional functions, including functions to:
    generate a context related vocabulary for use by the enterprise chatbot based on the correspondence between the one or more of the certain data elements with a data element in a list of historical data elements generated by the application of the probability function to the data elements in the obtained certain data elements.

9. The system of claim 5, wherein a smart device of the smart devices that provides anonymized, non-dialog data to the server is one of: a wearable fitness smart device, a wearable smart device, an exercise device, a personal assistance device, an audio system assistance device, or a home automation device.

10. The system of claim 5, wherein the server comprises processing circuitry that executes further programming code stored in the memory, which causes the server to perform functions, including functions to:
  determining the identified data type from multiple different data types based on a format of the received anonymized, non-dialog data.

11. The system of claim 5, wherein the server comprises processing circuitry that executes further programming code stored in the memory, which causes the server to perform functions, including functions to:
  determine a category of a smart device as indicated by the identified data type is one of a fitness device, a global positioning system device, a smart phone application that provides non-dialog data, a home automation device, or an audio system.

12. A non-transitory computer-readable storage medium storing computer-readable program code executable by a processor, wherein execution of the computer-readable program code causes the processor to:
  receive, via a coupling to an external network, a data set containing non-dialog data, wherein the data set is generated based on data provided by a smart device;
  extract the non-dialog data from the received data set;
  determine a data type of the extracted non-dialog data, wherein the determined data type is determined from multiple different data types based on a format of the received data set;
  select, based on the determined data type, a machine learning-based data transformation to be applied to the extracted non-dialog data;
  apply the selected machine learning-based data transformation to the extracted non-dialog data to obtain standardized non-dialog data, wherein applying the selected machine learning-based data transformation to the extracted non-dialog data includes functions to:
    weight a data type attribute based on an output from a machine learning algorithm trained using previously obtained non-dialog information of the same data type as the determined data type;
    input the weighted data type attribute into the selected machine learning-based data transformation;
    process the inputted weighted data type attributes according to the selected machine learning-based data transformation; and
    output data points and, for each data point, data point probability information as a standardized non-dialog data to a chatbot training data structure; and
  store the standardized non-dialog data in the chatbot training data structure.

13. The non-transitory computer-readable storage medium of claim 12, wherein execution of the computer-readable program code causes the processor to further:
  access a data structure containing data identifiers;
  compare the extracted non-dialog data to data identifiers stored in the data structure;
  based on a result of the comparison, identify the data type of the extracted non-dialog data; and
  output the identified data type as the determined data type.

14. The non-transitory computer-readable storage medium of claim 13, wherein the execution of the computer-readable program code causes the processor, when comparing the extracted non-dialog data to data identifiers stored in the data structure, to further:
  determine whether the non-dialog data includes a data identifier corresponding to either a wearable fitness smart device, a wearable smart device, an exercise device, a personal assistance device, an audio system assistance device, or a home automation device;
  extract the data identifier; and
  match the extracted data identifier to at least one of the data identifiers stored in the data structure containing data identifiers; and
  output the matching extracted data identifier as the result of the comparison.

15. The non-transitory computer-readable storage medium of claim 12, wherein the execution of the computer-readable program code causes the processor, when selecting a machine learning-based data transformation based on the determined data type, to further:
  access a data structure containing a plurality of machine learning-based data transformations; and
  select the machine learning-based data transformation from the plurality of machine learning-based data transformations to be applied to the extracted non-dialog data.

16. The non-transitory computer-readable storage medium of claim 12, further comprising:
  programming code that causes the processor to perform further functions to process the inputted weighted data type attribute according to the selected machine learning-based data transformation, including functions to:
    determine, by applying a probability function including the weighted data type attribute to data elements in the extracted non-dialog data, a correspondence between certain data elements in the extracted non-dialog data with a list of historical data elements;
    based on the determined correspondence, apply the selected machine learning-based data transformation to the certain data elements determined to have the correspondence in a historical data element in the list; and in response to applying the selected machine learning-based data transformation, generate a standardized chain of values as the data point probability information based on the determined correspondence, wherein the standardized chain of values includes relative probability values indicating a probability of a relationship between respective data elements of the certain data elements having the determined correspondence.

17. The non-transitory computer-readable storage medium of claim 12, wherein execution of the computer-readable program code causes the processor to further:

determine a category of the smart device as indicated by the data type is one of a fitness device, a global positioning system device, a smart phone application that provides non-dialog data, a home automation device, or an audio system.

\* \* \* \* \*